Dec. 11, 1956 E. GÁL ET AL 2,773,483

DRIVE MECHANISMS FOR PERCUSSION TOOLS OPERATED BY A PRESSURE MEDIUM

Filed Nov. 3, 1952 8 Sheets-Sheet 1

INVENTORS

ENDRE GÁL AND KÁROLY GERBER

BY Robert H. Jacob

AGENT

INVENTORS
ENDRE GÁL AND
KÁROLY GERBER
BY Robert H. Jacob
AGENT

Dec. 11, 1956 E. GÁL ET AL 2,773,483

DRIVE MECHANISMS FOR PERCUSSION TOOLS OPERATED BY A PRESSURE MEDIUM

Filed Nov. 3, 1952 8 Sheets-Sheet 3

INVENTORS
ENDRE GÁL AND
KÁROLY GERBER

BY Robert H. Jacob
AGENT

INVENTORS
ENDRE GÁL AND
KÁROLY GERBER
BY Robert H. Jacob
AGENT

Dec. 11, 1956 E. GÁL ET AL 2,773,483

DRIVE MECHANISMS FOR PERCUSSION TOOLS OPERATED BY A PRESSURE MEDIUM

Filed Nov. 3, 1952 8 Sheets-Sheet 5

INVENTORS
ENDRE GÁL AND
KÁROLY GERBER

BY Robert H. Jacob
AGENT

Dec. 11, 1956 E. GÁL ET AL 2,773,483

DRIVE MECHANISMS FOR PERCUSSION TOOLS
OPERATED BY A PRESSURE MEDIUM

Filed Nov. 3, 1952 8 Sheets-Sheet 6

INVENTORS
ENDRE GÁL AND
KÁROLY GERBER
BY Robert H. Jacob.
AGENT

INVENTORS
ENDRE GÁL AND
KÁROLY GERBER
BY Robert K. Jacob.
AGENT

Dec. 11, 1956 E. GÁL ET AL 2,773,483

DRIVE MECHANISMS FOR PERCUSSION TOOLS
OPERATED BY A PRESSURE MEDIUM

Filed Nov. 3, 1952 8 Sheets-Sheet 8

INVENTORS
ENDRE GÁL AND
KÁROLY GERBER
BY Robert H. Jacob
AGENT

United States Patent Office 2,773,483

Patented Dec. 11, 1956

2,773,483

DRIVE MECHANISMS FOR PERCUSSION TOOLS OPERATED BY A PRESSURE MEDIUM

Endre Gál and Károly Gerber, Budapest, Hungary, assignors to "Licencia" Talalmanyokat Ertekesito Vallalat, Budapest, Hungary Application November 3, 1952, Serial No. 339,496

Claims priority, application Hungary November 3, 1951

13 Claims. (Cl. 121—30)

This invention relates to improvements in drive mechanisms for percussion tools operated by a pressure medium.

The drive mechanisms of percussion tools hitherto known and operated by a pressure medium have the common characteristic of comprising valves and springs as well as a substantial number of motional construction parts. Thus, on one hand, their construction is relatively cumbersome and, on the other hand, their work is somewhat delicate since the springs will, in time, sag or may break.

The present invention aims at providing a drive mechanism which comprises no springs at all and, at the same time, only a low number of motional construction parts. The invention is based upon the discovery that such a construction is obtainable by applying a piston and a slider which are movably arranged in each other and formed together with the stationary parts of the drive mechanism so that both work and control thereof is rendered possible without applying any further motional construction parts. Thus, the invention refers to drive mechanisms for percussion tools operated by a pressure medium and having a high pressure chamber adapted to be connected to a source of such medium and a low pressure chamber adapted to be connected to the atmosphere. The drive mechanism in compliance with the main feature of the present invention comprises a guide means situated between the high pressure chamber and the low pressure chamber; a piston formed as a tool carrier and slidably arranged between two extreme positions along the guide means; a slider formed as a control means and slidably arranged between two extreme positions along the piston; two work chambers each enclosed by the guide means and the piston, the volumes of the work chambers being adapted to vary alternately in opposite sense in dependance on the mutual position of the guide means and the piston; and ducts for connecting the work chambers alternately to the high pressure chamber and the low pressure chamber, respectively, in dependance on the mutual position of the guide means, the piston and the slider.

Further details of the invention will be described by taking reference to the accompanying drawings which show—by way of example—some preferred embodiments thereof. In the drawings.

Like details are referred to by the same numbers of reference throughout the drawings.

Figures 1, 4, 5, 6, 7:
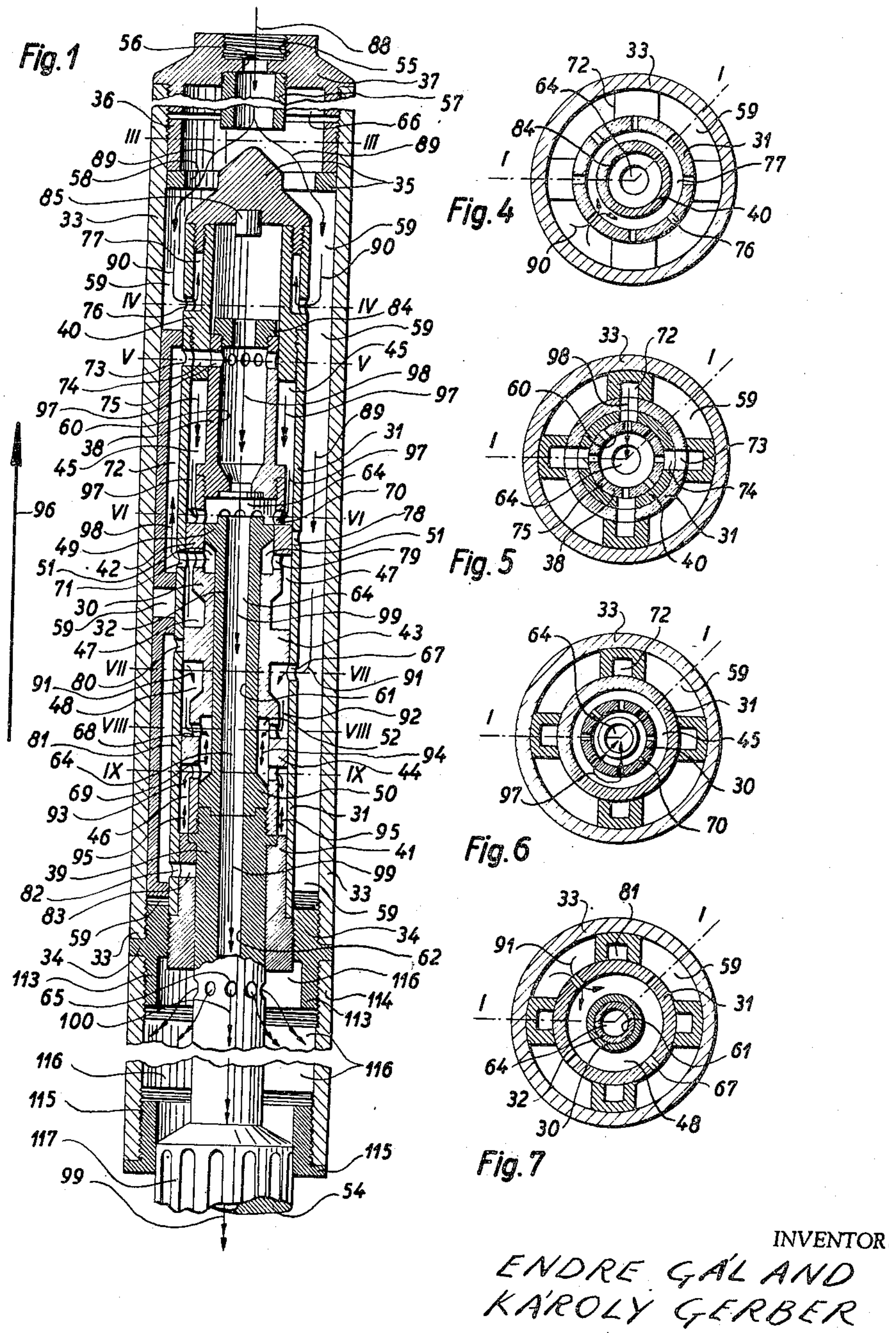
Fig. 1 is a longitudinal section of one embodiment of the invention, taken along line I—I in Figs. 3 to 9.
Fig. 4 is a cross section taken along line IV—IV in Fig. 1.
Fig. 5 is a cross section taken along line V—V in Fig. 1.
Fig. 6 is a cross section taken along line VI—VI in Fig. 1.
Fig. 7 is a cross section taken along line VII—VII in Fig. 1.
Figure 2:
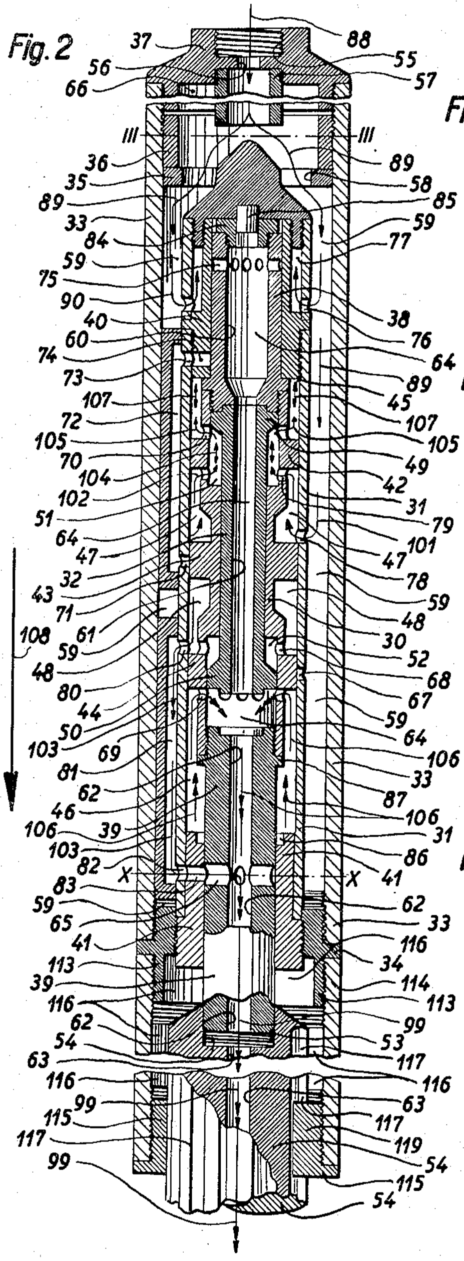
Fig. 2 shows a like longitudinal section taken along line II—II in Figs. 3 and 10 and illustrating another working position of the embodiment according to Fig. 1.
Figure 3:
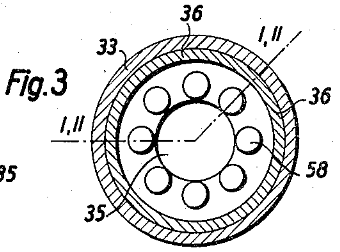
Fig. 3 is a cross section taken along line III—III in Figs. 1 and 2.

In the drawings, the drive mechanism shown in Figs. 1 to 10 has two motional construction parts only. One of these parts is formed by a piston body 30 which is arranged slidably between two extreme positions along and within a relatively stationary guide means 31 formed as a sleeve. The other motional construction part consists in a slider 32 which is—in turn—slidable between two extreme positions along the piston body 30. The guide means 31 is accommodated within a casing 33 to which it is fastened, on one hand, by a threaded insert 34, and, on the other hand, by an inlet head 35 and a ring-fastener 36. The casing 33 is closed by a connection head 37. The piston body 30 has at its either end piston portions 38 and 39, respectively, screw-threadedly fastened to it. By means of exchangeable inserts 40 and 41, respectively, which may be regarded at as integral portions of the guide means 31 the piston portions 38 and 39 are guided in the end portions of the guide means 31 and together with the piston body 30 they form the piston 30, 38, 39 proper. Furthermore, the piston body 30 is provided with three annular shoulders 42, 43, 44 which divide the space between the piston body 30 and the guide means 31 as well as between the two inner front surfaces of the inserts 40 and 41 into four subspaces. The two outer subspaces, the volumes of which vary in dependance on the mutual position of the piston body 30 and the guide means 31 in opposite sense, form work chambers 45 and 46, respectively, whilst the two inner subspaces, the volumes of which remain constant during the motion of the piston body 30 relatively to the guide means 31, constitute each an ante-chamber 47 and 48, respectively. Both ends of the slider 32 are provided each with a shoulder 49 and 50, respectively, which enclose with the piston body 30 control chambers 51 and 52, respectively, the volumes of which vary in dependance on the mutual position of the piston body 30 and the slider 32 in opposite sense. As is shown in Figs. 1 and 2, the piston portion 39 protrudes from the insert 41 and its protruding end 53 is provided with threads by which the piston portion 39 has a tool support 54 fixed to it as is known in the art. Thus, the piston 30, 38, 39 constitutes the tool carrier of the drive mechanism.

The connection head 37 is provided with a threaded bore 55 which communicates through a duct 56, a pipe 57 screwthreadedly fixed to the inner side of the connection head 37, and through bores 58 of the inlet head 35 with a space 59 between the casing 33 and the guide means 31, the space 59 forming the high pressure chamber of the drive mechanism. Both the piston body 30 with its portions 38 and 39, and the slider 32 are formed as hollow bodies. The hollow space or chamber of the piston portion 38 is referred to by reference number 60, and those of the slider 32 and the piston portion 39 by numbers of reference 61 and 62, respectively. The tool support 54 is provided with a chamber 63 which forms the continuation of the chamber 62 and through which the chambers 60 to 63 forming the low pressure chamber 64 of the drive mechanism communicate with the atmosphere. Where the piston portion 39 protrudes from the insert 41 it is provided with ducts 65 communicating with the chamber 62. The pipe 57 forms an air chamber 66 with the connection head 37.

Between the high pressure chamber 59 and the low pressure chamber 64 which are separated by the guide means 31 there are ducts for alternately connecting the work chambers 45 and 46 to the high pressure chamber 59 and the low pressure chamber 64, respectively, in dependance on the mutual position of the guide means 31, the piston 30, 38, 39 and the slider 32.

Figure 8:
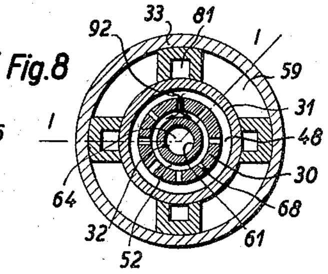
Fig. 8 is a cross section taken along line VIII—VIII in Fig. 1.
Figure 9:
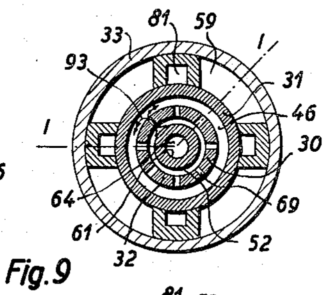
Fig. 9 is a cross section taken along line IX—IX in Fig. 1.

Fig. 1 illustrates a working position of the drive mechanism wherein the high pressure chamber 59 communicates with the work chamber 46 through inlet ducts 67 of the guide means 31. The inlet ducts 67 are evenly disposed along the circumference of the machine as is shown in Fig. 7, and connecting the high pressure chamber 59 to the ante-chamber 48. The latter communicates through guide-over ducts 68 of the piston body 30 above the shoulder 44 thereof with the control chamber 52 which, in turn, communicates through ducts 69 provided below the shoulder 44 with the work chamber 46. Figs. 7 to 9 show ducts 67 and 68, 69 being evenly disposed along the circumference of the guide means 31 and the piston 30, respectively.

On the other hand, in the working position of the drive mechanism shown in Fig. 1 the work chamber 45 communicates with the low pressure chamber 64 through ducts 70 provided in the piston body 30 above the shoulder 42 thereof. The ducts 70 are evenly disposed along the circumference of the piston body 30 as is shown in Fig. 6. The ante-chamber 47 and the control chamber 51 communicate with the low pressure chamber 64 through four outlet ducts 71 evenly disposed along the circumference of the guide means 31 and through channels 72 welded to the guide means 31. The other ends of the channels 72 run through outlet ducts 73 of the guide means 31 and outlet ducts 74 of the insert 40, further through outlet ducts 75 of the piston portion 38 into the chamber 60 of the latter, whilst the chamber 60 communicates through the chamber 61 of the slider 32, the chamber 62 of the piston portion 39 and the chamber 63 of the tool support 54, further through the ducts 65 of the piston portion 39 with the atmosphere. The disposition of both the channels 72 and the ducts 73, 74, 75 is illustrated in Fig. 5 in cross section. Figs. 1, 2 and 4 show that between the guide means 31 and the insert 40 there is an annular space which communicates through ducts 76 of the guide means 31 with the high pressure chamber 59 thus forming a further air chamber 77. The ducts 76 are evenly disposed along the circumference of the guide means 31 as is shown in Fig. 4.

Figure 10:
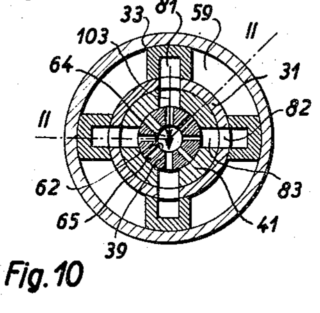
Fig. 10 is a cross section taken along line X—X in Fig. 2.
Figure 11:
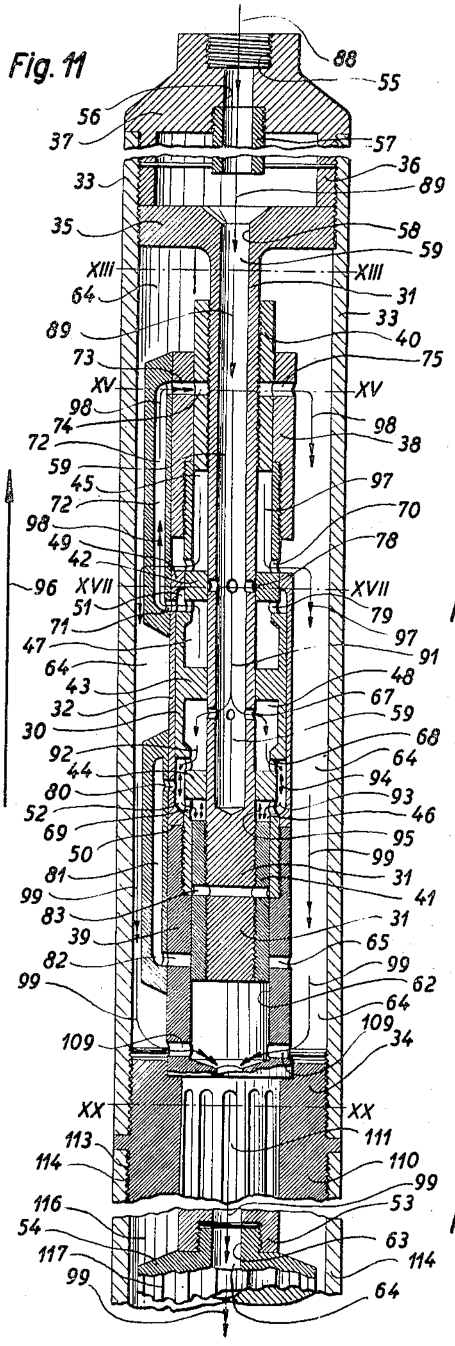
Fig. 11 shows a longitudinal section of another embodiment of the invention, taken along line XI—XI in Figs. 13, 15, 17 and 20.
Figure 13:
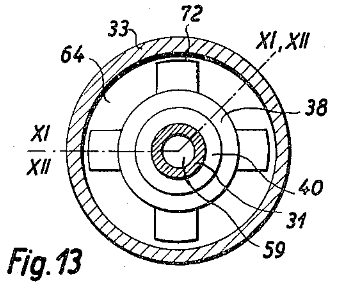
Fig. 13 is a cross section taken along line XIII—XIII in Figs. 11 and 12.
Figure 15:
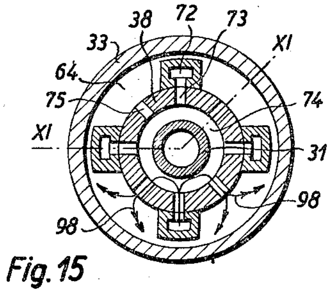
Fig. 15 is a cross section taken along line XV—XV in Fig. 11.
Figure 17:
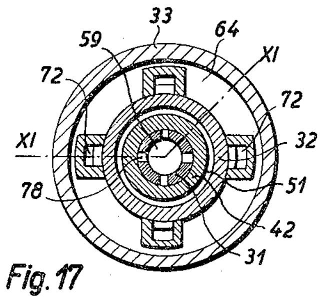
Fig. 17 is a cross section taken along line XVII—XVII in Fig. 11.
Figure 20:
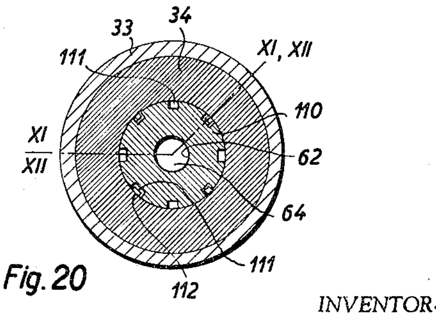
Fig. 20 is a cross section taken along line XX—XX in Figs. 11 and 12.
Figure 12:
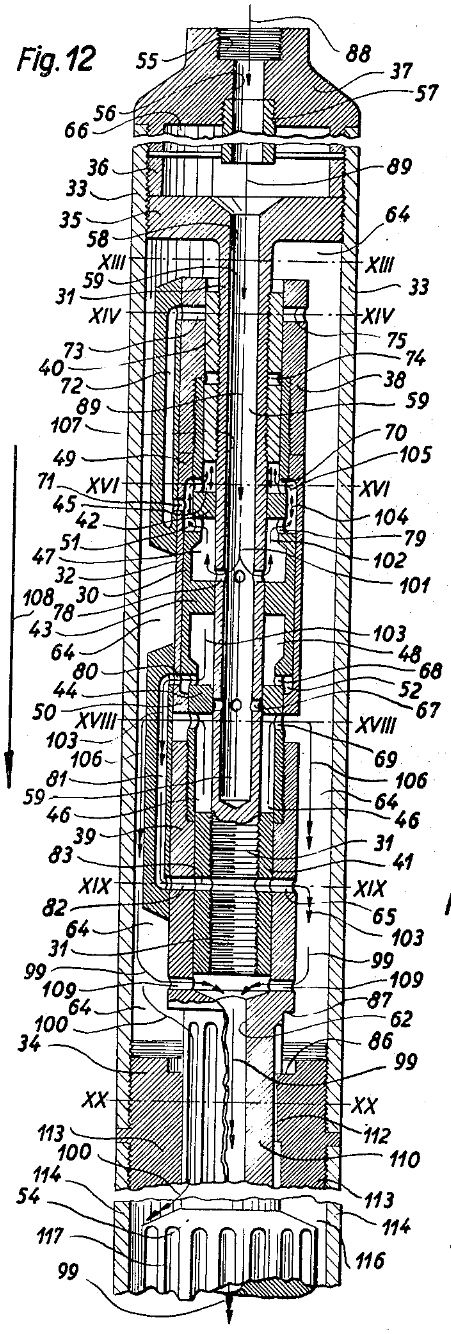
Fig. 12 is a like longitudinal section taken along line XII—XII in Figs. 13, 14, 16, 18, 19 and 20.
Figures 14, 16, 18, 19:
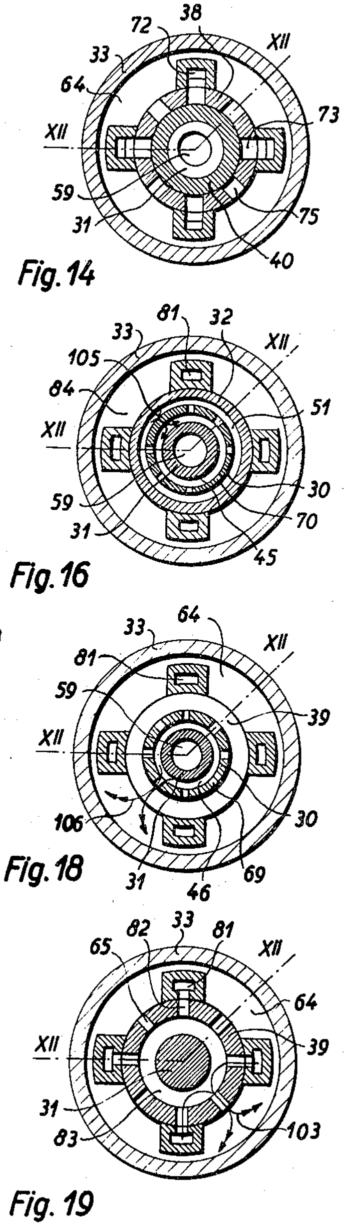
Fig. 14 is a cross section taken along line XIV—XIV in Fig. 12.
Fig. 16 is a cross section taken along line XVI—XVI in Fig. 12.
Fig. 18 is a cross section taken along line XVIII—XVIII in Fig. 12.
Fig. 19 is a cross section taken along line XIX—XIX in Fig. 12.

When the drive mechanism is in its working position shown in Fig. 2, the ducts connecting the work chambers 45 and 46 with the low pressure chamber 64 and the high pressure chamber 59, respectively, occupy a position which is opposite to that shown in Fig. 1, the low pressure chamber 64 being connected to the work chamber 45 and the high pressure chamber 59 being connected to the work chamber 46. In such a case the function of the inlet ducts 67 is performed by inlet ducts 78 formed in the guide means 31 similarly to the inlet ducts 67. The function of the guide-over ducts 68 is performed by guide-over ducts 79 which are arranged below the shoulder 42 of the piston body 30 in an arrangement similar to that of the guide-over ducts 68. The function of the outlet ducts 71 is performed by outlet ducts 80 provided in the guide means 31 similarly to the outlet ducts 71. The function of the channels 72 is performed by channels 81 welded to the guide means 31. The function of the outlet ducts 73, 74, 75 is performed by outlet ducts 82 and 83 situated in the guide means 31 and the insert 41, respectively, and by outlet ducts 65 of the piston portion 39. The inlet ducts 78, the guide-over ducts 79, the outlet ducts 80, the channels 81, the outlet ducts 82, 83 and the outlet ducts 65 connect the work chamber 45 to the high pressure chamber 59, and the work chamber 46 and the control chamber 52 to the low pressure chamber 64, respectively. This mutual position of the channels 81 and the outlet ducts 82, 83, 65 is represented in Fig. 10.

The end of the piston portion 38 has a threaded sleeve 84 screw-threadedly fastened to it. In the dead-centre position of the piston 30, 38, 39, shown in Fig. 2, the sleeve 84 interlocks with a cylindrical bolt 85 the cross section of which is equal to that of the hollow space of the sleeve 84, the bolt 85 being arranged on the lower portion of the inlet head 35. Thus, in the dead-centre position of the piston 30, 38, 39, shown in Fig. 2, between the piston 30, 38, 39 and the guide means 31 there is an annular interstice in which the remaining pressure medium forms a cushion and thereby prevents that the piston strike up against its counter-surface. In the dead-centre position shown in Fig. 1 the above said function is performed by an annular shoulder 86 which is provided on the upper front surface of the insert 41 as is indicated in Fig. 2. The piston portion 39 has a shoulder 87 which is indicated in Fig. 2 and fits into the annular shoulder 86 as illustrated in Fig. 1.

In operation, the pressure medium, for instance a hydraulic medium as water under pressure, is delivered by a not represented pump means of an output of e. g. 350 liters/minute at a pressure of e. g. 25 to 40 atm. The hydraulic medium enters the drive mechanism in the direction of the arrow 88 through a not represented supply means, for instance a pipe conduit which is connected to the threaded bore 55 of the connection head 37. The hydraulic medium passes the channel 56 and the pipe 57 and then arrives in the direction of the arrows 89 through bores 58 of the inlet head 35 in the high pressure chamber 59. Herefrom the hydraulic medium flows, on one hand, in the direction of the arrows 90 through passages 76 into an air chamber 77 and, on the other hand, in dependence on the mutual position of the piston 30, 38, 39, the guide means 31 and the slider 32 either into the work chamber 45 or into the work chamber 46.

In the work position shown in Fig. 1 the hydraulic medium flows from the high pressure chamber 59 through the inlet ducts 67 in the direction of the arrows 91 into the ante-chamber 48 and from here in the direction of the arrows 92 through the guide-over ducts 68 into the control chamber 52 wherefrom it passes in the direction of the arrows 93 through the ducts 69 of the piston into the work chamber 46. The pressure prevailing in the control chamber 52, as indicated by the double arrows 94, causes the slider 32 to occupy its position shown in Fig. 1, i. e. its lower dead-centre position as regards the drawing. The pressure prevailing in the work chamber 46, as suggested by the double arrows 95, on the other hand, urges the piston 30, 38, 39 into the position shown in Fig. 2, that is to move upwards as regards the drawing since the pressure acts, on one hand, upon the upper front surface of the relatively stationary insert 41 and, on the other hand, upon the lower front surface of the shoulder 44 of the piston body 30. When the piston 30, 38, 39 is displaced upwards in the direction of the arrow 96, the hydraulic medium which performed its work in the work chamber 45 during the previous stroke, withdraws in the direction of the double pointed arrows 97 through the ducts 70 of the piston into the low pressure chamber 64. On the other hand, the hydraulic medium in the ante-chamber 47 and in the control chamber 51 flows in the direction of the double pointed arrows 98 through the guide-over ducts 79 of the piston body 30, furthermore through the outlet ducts 71 of the guide means 31, the channels 72, the outlet ducts 73 of the guide means 31, the outlet ducts 74 of the insert 40 and through the outlet ducts 75 of the piston portion 38 into the low pressure chamber 64, i. e. into the chamber 60 of the piston portion 38 wherefrom it flows together with the hydraulic medium withdrawing from the work chamber 45 in the direction of the double pointed arrows 99 through the low pressure chamber 64 and through the chamber 63 of the tool support 54 off the drive mechanism.

As the piston 30, 38, 39 continues its upward way, the outlet ducts 73, 74 and 75, respectively, are displaced from their registering position and the shoulder 42 of the piston body 30 sets free the inlet ducts 78 of the guide means 31. Thus, the hydraulic medium flows from the high pressure chamber 59 in the direction of the arrows 101 into the ante-chamber 47 and herefrom in the direction of the arrows 102 into the control chamber 51. The pressure which then prevails here, as suggested by the double arrow 104, will be equal to the pressure prevailing in the control chamber 52, as suggested by the double arrow 94, whereby the slider 32 becomes relieved from the force by which it was urged into its dead-centre position shown in Fig. 1.

As the piston 30, 38, 39 becomes further displaced, the piston body 30 occupies a position shown in Fig. 2 wherein the shoulder 44 thereof closes the inlet ducts 67 of the guide means 31 and the guide-over ducts 68 of the piston body 30 register with the outlet ducts 80 of the guide means 31. Furthermore, the outlet ducts 65 of the piston portion 39 occupy a registering position with the outlet ducts 82 and 83 of the guide means 31 and the insert 41, respectively. Thus, the ante-chamber 48 and the control chamber 52 are connected through the channels 81 to the chamber 62 of the piston portion 39 and thereby to the low pressure chamber 64 and the atmosphere. The hydraulic medium now flows from the chambers 48 and 52 in the direction of the double pointed arrows 103 into the chamber 62 of the piston portion 39 and herefrom through the low pressure chamber 64 in the direction of the arrows 99 into the atmosphere. The pressure prevailing in the control chamber 52, as suggested by the double arrows 94, is then compensated and the pressure prevailing in the control chamber 51, as suggested by the double arrow 104, becomes preponderant so that it urges the slider 32 into its dead-centre position shown in Fig. 2.

In this position the control chamber 51 communicates through the ducts 70 of the piston body 30 with the work chamber 45 whereas the work chamber 46 is connected through the outlet ducts 69 of the piston body 30 to the low pressure chamber 64 and therethrough to the atmosphere. Thus, the hydraulic medium flows from the control chamber 51 in the direction of the arrows 105 into the work chamber 45 whilst the hydraulic medium in the work chamber 46 passes therefrom in the direction of the double pointed arrows 106 into the chamber 62 of the piston portion 39 and herefrom together with the hydraulic medium withdrawing from the chambers 48 and 52 in the direction of the arrows 99 into the atmosphere. Therefore, the pressure prevailing in the work chamber 46 becomes compensated too whereas in the work chamber 45 there prevails a pressure, as suggested by the double arrows 107, by which the piston 30, 38, 39 will be displaced in the direction of the arrow 108 into a position shown in Fig. 1.

When the piston 30, 38, 39 approaches to the position shown in Fig. 1, the outlet ducts 65 of the piston portion 39 will be displaced from the position in which they register with the outlet ducts 82 and 83 of the guide means 31 and the insert 41, respectively, so that the connection between the ante-chamber 48, the control chamber 52 and the low pressure chamber 64 and the atmosphere becomes interrupted. Hereafter the shoulder 44 of the piston body 30 sets free the inlet ducts 67 of the guide means 31 through which the hydraulic medium flows from the high pressure chamber 59 in the direction of the arrows 91 into the ante-chamber 48 and from here through the guide-over ducts 68 of the piston body 30 in the direction of the arrows 92 into the control chamber 52. In this chamber there sets in a pressure, as indicated by the double arrows 94, which is equal to the pressure prevailing in the control chamber 51, as indicated by the double arrows 104, yet opposite thereto as regards the load of the slider 32 so that the force urging the slider 32 into its dead-centre position shown in Fig. 2 becomes compensated. Meanwhile, the hydraulic medium displaced from the work chamber 46 flows in the direction of the arrows 106 through the outlet ducts 69 of the piston body 30 into the low pressure chamber 64 wherefrom it withdraws together with the hydraulic medium coming from the ante-chamber 48 and the control chamber 52 in the direction of the arrows 103 through the chamber 63 of the tool support 54 in the direction of the arrows 99 into the atmosphere.

When the piston 30, 38, 39 reaches its dead-centre position shown in Fig. 1, the inlet ducts 78 of the guide means 31 become closed by the shoulder 42 of the piston body 30 whilst the outlet ducts 75 of the piston portion 38 come into a registering position with the outlet ducts 73 and 74 of the guide means 31 and the insert 40, respectively. The pressure prevailing in the control chamber 51, as suggested by the arrow 104, will then be compensated through the guide-over ducts 79 of the piston body 30, the outlet ducts 71 of the guide means 31, the channels 72, the outlet ducts 73 and 74 and through the low pressure chamber 64. Thus, the action of the overpressure prevailing in the control chamber 52, as indicated by the double arrows 94, is free to act upon the slider 32 which will be displaced into its dead-centre position shown in Fig. 1 so that the hydraulic medium flows through the control chamber 52 and the outlet ducts 69 of the piston body 30 into the work chamber 46 and sets up a pressure therein, as indicated by the double arrows 95. Simultaneously therewith the pressure prevailing in the work chamber 45 becomes compensated since this chamber communicates through the ducts 70 of the piston set free by the slider 32 with the low pressure chamber 64 and thereby with the atmosphere. Thus, under the action of the pressure prevailing in the work chamber 46, as suggested by the double arrows 95, the piston 30, 38, 39 will again be displaced upwards in the direction of the arrow 96 whereby the above described cycle starts again.

Obviously, as soon as the overpressure is prevailing simultaneously in both chambers 51 and 52, the slider 32 is relieved from the action of the hydraulic medium so that it can freely be displaced under the action of its inertia, that is the mass forces of the slider structure. With the exception of the gravitation the mass forces are always directed towards the desired displacement of the slider 32 so that the control action is furthered thereby. Moreover, in intermediate positions of the piston 30, 38, 39, that is in case of strokes which are shorter than the complete stroke determined by both dead-centre positions shown in Figs. 1 and 2, respectively, the mass forces themselves cause the slider 32 to be displaced as is necessary for the control. Thus, the control of the drive mechanism is readily feasible since it is only necessary to adjust the distance of the guide means 31 from the surface to be striken upon according to the desired length of the stroke. When the tool carried by the tool support 54 impacts, the slider 32 will automatically be displaced from its position shown in Fig. 2 into its position shown in Fig. 1 whereby the displacement of the piston 30, 38, 39 from the piston shown in Fig. 1 into the position shown in Fig. 2 is automatically entailed. Thus, the slider 32 can be regarded as the control means of the mechanism in accordance with the present invention.

The embodiment shown in Figs. 11 to 20 differs from the previous one only in that with the latter the guide means 31 is formed by a sleeve encircling the piston 30, 38, 39 whilst with the former the guide means 31 is formed by a hollow rod which protrudes into the piston 30, 38, 39 which is in both cases inserted between the guide means 31 and the slider 32 and is separated from the high pressure chamber 59 by the former. Furthermore, the casing 33, the guide means 31, the piston 30, 38, 39 and the slider 32 is formed in both cases by coaxially arranged cylindrical bodies. Thus, both represented embodiments can be regarded as the mirror images of each other each of which differing from the other only in that the guide means 31 and the slider 32 change place. Naturally, by this change of place the ducts connecting the high pressure chamber 59 to the low pressure chamber 64 become somewhat modified. This modification is, however, so insignificant that the flow of the hydraulic medium takes place substantially similarly to that described with reference to Figs. 1 to 10, as is suggested by the same numbering of the arrows used for indicating the direction of flow. If it is considered that the outlet ducts 71 and 80 are, in case of the embodiment shown in Figs. 11 to 20, situated in the slider 32 and not, as was in the previous case, in the guide means 31, furthermore, that the channels 72, 81 and the outlet ducts 73, 82 are, instead of the guide means 31, welded to and formed in the piston portions 38 and 39, respectively, the alternate flow of the hydraulic medium from the high pressure chamber 59 through both work chambers 45 and 46 into the low pressure chamber 64 takes place, as regards its details and the denotation, completely in such a manner as has been described in connection with the embodiment shown in Figs. 1 to 10. Merely, in connection with the shape of the piston portion 39 is to be mentioned that the chamber 62 is in constant communciation with the annular portion of the low pressure chamber 64 outside thereof through inlet ducts 109 which are evenly distributed along the circumference of the piston portion 39 whereby both the unprevented withdrawal of the exhausted hydraulic medium and the continuous compensation of the sugging and compressing actions within the piston portion 39 is obtained. Furthermore, the piston portion 39 has a grooved extension 110 the grooves 111 of which partly interlock with keys 112 formed on the inner wall of the hollow insert 34 as is particularly shown in Fig. 20. The grooves 111 and the keys 112 interlocking with one another substantially form a positive control connection by which the mutual angular position of the piston 30, 38, 39 and the guide means 31 is determined. Thereby, rotating the drive mechanism around its longitudinal axis, furthermore the additional outflow described in connection with the previous embodiment is rendered possible. Obviously, in the working position shown in Fig. 12 the grooves protrude above both front surfaces of the insert 34 thereby forming ducts which lead through the insert 34 and through which the hydraulic medium in the annular portion of the low pressure chamber 64 between the piston 30, 38, 39 and the casing 33 can flow into the atmosphere in the direction of the double pointed arrows 100 bypassing the chamber 63.

Obviously, the greatest significance of the present invention consists in the decrease of the number of the motional construction parts to two, that is in forming a drive mechanism of simple construction and reliable work. The simplicity of the construction and thereby its work reliability and lifetime is increased by that even these two motional construction parts are formed by simple, rigid and compact bodies at the selecting of the sizes of which the resistance to wear is decisive rather than the mechanical stresses. Thus, the drive mechanism in accordance with the present invention has—in contradistinction to like apparatus—neither disc valves nor returning springs. Thereby, obviously, not only the simplicity of the construction of the drive mechanism and the reliability thereof is favourably influenced but also the frequency of its working speed is increased since the delays which are inevitable with the opening and closing of disc valves and with the stretching or releasing the springs are eliminated. The drive mechanism in accordance with the present invention is controlled, as it were, directly by the flow of the hydraulic medium and by the mass forces so that the work period is much more frequent than is the case with the known apparatus working with disc valves and springs.

As has been shown, the condition of embodying the invention consists in that a piston and a slider moving in each other be applied it being without significance which of both motional construction parts is inside or outside of the other. Furthermore, it has been shown that it is preferable to insert the piston between the guide means and the slider since in this case not only the construction of the guide means, the piston and the slider may be rendered relatively more simple but also the ducts which alternately connect the work chambers to the high pressure chamber and the low pressure chamber, respectively, will be rendered more simple. Thus, a favourable embodiment can be obtained by the above said arrangement if, in accordance with the present invention, the work chambers 45 and 46 are associated each with a control chamber 51 and 52 which are enclosed by the piston 30, 38, 39 and the slider 32 and the volumes of which vary alternately in opposite sense in dependance on the mutual position of the piston and the slider, the control chambers being situated before the associated work chamber and communicating therewith directly when the slider occupies its extreme position associated with the greatest volume of the corresponding control chamber. An embodiment with such an arrangement of the control chambers 51 and 52 is readily feasible if, in compliance with a further feature of the present invention, on one hand, the piston 30, 38, 39 is provided with three shoulders 42, 43, 44 the two lateral ones of which enclosing the work chambers 45 and 46 with the guide means 31 and the intermediate shoulder 43 forming with each lateral shoulder 42 and 44 an ante-chamber 47 and 48 which communicates in dependance on the mutual position of the piston 30, 38, 39 and the guide means 31 alternately with the high pressure chamber 59 and the low pressure chamber 64, respectively, and, on the other hand, the slider 32 is provided with two shoulders 49 and 50 each being associated with a lateral shoulder 42 and 44 of the piston and enclosing therewith a control chamber 51 and 52, respectively, which constantly communicates with the ante-chamber 47 and 48, respectively, adjacent to the associated shoulder of the piston. Such embodiments are shown in Figs. 1 to 20. The elements of construction are entirely independent from whether the guide means—as has been shown in connection with Figs. 1 to 10—is formed by a sleeve enclosing the piston or—as has been shown in connection with Figs. 11 to 20—by a hollow rod protruding into the piston. With the represented embodiments the guide means 31, the piston 30, 38, 39 and the slider 32 are formed by coaxially arranged cylindrical bodies. However, this is but a favourable feature of the invention by which the possibilities of manufacturing, that is the requirements of the art can be considered. Principally, it is also possible to apply construction parts the form of which differs from that of a cylinder and the arrangement thereof is other than coaxial.

Figures 21, 22, 23, 24, 25:
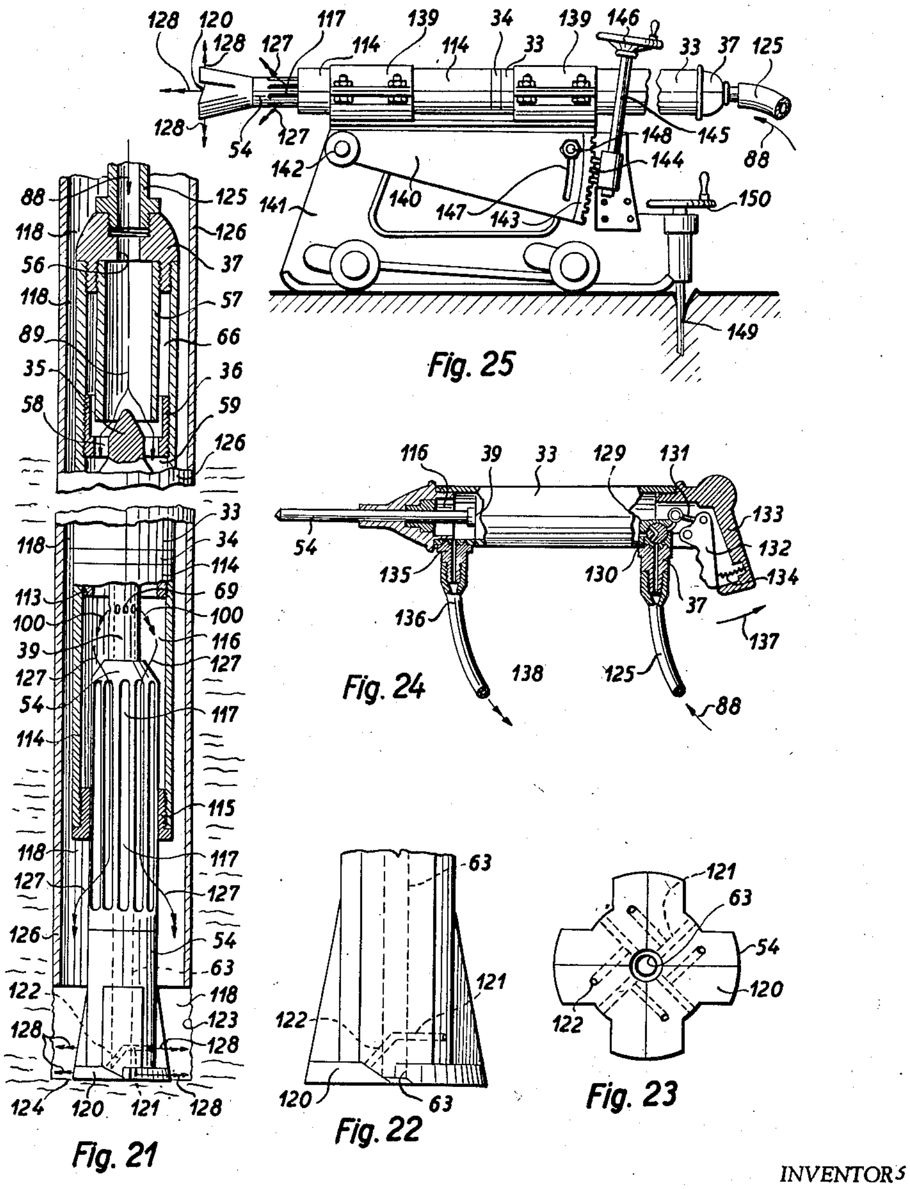
Fig. 21 shows a longitudinal section of a deep boring percussion drill provided with a drive mechanism illustrated in Figs. 1 to 10.
Fig. 22 is a side elevational view, on a larger scale, of the tool of the percussion drill shown in Fig. 21.
Fig. 23 is a bottom view to Fig. 22.
Fig. 24 is a side elevational view, partly in section, of a hand percussion tool provided with a drive mechanism in compliance with the present invention.
Fig. 25 is a side elevational view of a cutting machine provided with a drive mechanism according to the invention.

Figs. 21 to 23 show the above described drive mechanism in connection with a percussion deep boring apparatus. As is shown in Figs. 1 and 2, the threaded extension 113 of the insert 34 has a sleeve 114 fixed to it which forms the continuation of the guide means 31. In the lower end of the sleeve 114 there is a guide ring 115 screw-threadedly fixed. A tool of the known type is formed integral with the tool support 54 and is guided in the ring 115 which encloses with the sleeve 114, the insert 34 and the insert 41 an outlet chamber 116. In the dead-centre position of the pistons 30, 38, 39, shown in Fig. 1, the chamber 116 communicates through the outlet ducts 65 with the low pressure chamber 64 whereas, by means of grooves 117 on the mantle surface of the tool support 54, it constantly communicates with the atmosphere 118. Some of the grooves 117 interlock with keys 119 provided on the inner mantle surface of the ring 115, one of the keys being represented in Fig. 2. The chamber 63 goes through the tool support 54 and at the working surface 120 of the tool proper opens into the atmosphere 118. Before the orifice ducts 121 are leading off from the chamber 63 in a transverse direction and open on the mantle surface of the tool support 54 also into the atmosphere 118. On the other hand, oblique ducts 122 are leading off from the ducts 121 and extending through to the oblique areas of the working surface 120. By these oblique areas of the working surface 120 the tool support 54 is exposed to a rotating moment when the tool proper impacts upon the bottom 124 of a bore hole 123. Reference numeral 125 refers to the duct means of the hydraulic medium and reference numeral 126 designates a supply duct means known per se and applied with deep boring machines as is known to those skilled in the art.

In operation, the hydraulic medium flows in the lower dead-centre position of the pistons 30, 38, 39, as shown in Fig. 1, through the openings 65 into the chamber 116 and herefrom through the grooves 117 into the atmosphere 118 and, furthermore, through the chamber 62 of the piston portion 39 and the chamber 63 of the tool carrier 54 as well as through the ducts 121, 122 also into the atmosphere 118 whereby the bore hole 123 is suitably rinsed as is suggested by the arrows 127 and 128, respectively. In the upper dead-centre position of the pistons 30, 38, 39, as shown in Fig. 2, the ducts 65 communicate through the ducts 83 of the insert 41 with the channels 81 and not with the outlet chamber 116. Thus, in this case, the hydraulic medium does not withdraw in the direction of the arrows 127 but flows only in the direction of the arrows 128. Yet, it flows into the atmosphere 118 at a relatively higher level of the tool support 54 so that the rinsing effect is adjusted to the actual needs. If the turning moment resulting from the impact of the tool upon the bore hole bottom 124 is not enough to effect the desired rotation of the tool, such rotation may be obtained by rotating the supply pipe means 125 the rotation of which being transmitted by the connection head 37, the casing 33 and the sleeve 114 to the keys 119 and therefrom, by means of the grooves 117, onto the tool support 54.

The deep boring apparatus has been described by taking reference to the drive mechanism shown in Figs. 1 to 10. However, the embodiment in accordance with Figs. 11 to 20 might obviously be applied in a similar way. The piston portion 39 being—in this case—also provided with grooves 111 some of which interlock by means of keys 112 of the insert 34 with the casing 33 and thereby with the supply pipe means 125, the keys 119 of the ring 115 interlocking with the grooves 117 of the tool support 54 may be dispensed with as regards rotation of the tool.

The output of a deep boring apparatus in compliance with the present invention may be estimated by experiments which have been effected by means of trial borings in andesite. Applying a pressure of 25 at a bore hole of a depth of 40 cm. was obtained during 15 minutes whilst when applying a pressure of 40 at the depth of the bore hole obtained during eight minutes amounted to 34 cm.

Fig. 24 shows the drive mechanism in compliance with the present invention built in in a chiselling machine which is formed as a hand implement. In this case the supply pipe means 125 is formed by an elastic hose through which the hydraulic medium enters a valve 130 accommodated in a valve casing 129 screw threadedly fastened to the connecting head 37 and flows therefrom into the drive mechanism placed within the casing 33. The operating mechanism of the valve 130 is, in a manner well known in the art, formed by a link member 131 and by a trigger 132 which are swingably supported in the handle of the implement. Between the trigger 132 and the handle 133 there is a spring 134 inserted which urges the valve 130 towards its closing position. The outlet chamber 116 communicates through a joint 135 with pipe means 136 for the withdrawing hydraulic medium, the pipe means being formed also by an elastic hose.

When the trigger is pressed down in the direction of the arrow 137 against the action of the spring 134, the ducts within the valve 130 occupy a position in which they register with the ducts of the valve guide means or valve casing 129 and the hydraulic medium flows therethrough into the drive mechanism and operates it in the above described manner. The exhausted hydraulic medium withdraws from the outlet chamber 116 through the joint 135 and through the pipe means 136 in the direction of the arrow 138. When releasing the trigger 132, the valve 130 is returned by the spring 135 into its closing position shown in Fig. 24. In this position the flow of the hydraulic medium is interrupted and the drive mechanism stops.

Fig. 25 shows the drive mechanism according to the present invention mounted into a cutting machine. The drive mechanism is, by means of buckles 139, dismountably fastened to a bed 140 which is supported by an underframe 141 so that it can be swung in the vertical plane around a pivot 142. The angular position of the bed 140 in the vertical plane is rendered adjustable by a worm wheel 144 interlocking with a toothed arc 143, the worm wheel 144 being rotatable by a hand wheel 146 fixed to the axle 145 of the former. The angular position in the vertical plane can be fixed by a screw 148 which interlocks with a curved grooved guide 147 formed in the bed 140, the screw 148 being supported by the underframe 141. Against longitudinal displacements the cutting machine can be fixed by a threaded bolt 149 which interlocks with the soil and is also supported by the underframe 141 and rotatable by a hand wheel 150. The adjustment in the horizontal plane is effected by rotating the entire machine.

In operation, the drive mechanism of the machine functions as has been described above. The hydraulic medium flows in through the pipe means 125 and withdraws through the chamber 63 of the tool support 54 and the grooves 117 in the direction of the double pointed arrows 127 and 128, respectively, as has been described in connection with the embodiment shown in Figs. 21 to 23. In order to advance the tool the buckles 139 will be loosened and the drive mechanism will, by means of its casing 33 and sleeve 114, be pushed further whereafter its new position is secured by tightening the buckles 139. A displacement of the entire machine will have to take place only when the drive mechanism reaches its lefthand extreme position relatively to the bed 140 so that by a further displacement in this direction the drive mechanism would, at least partly, leave the buckle 139 on the righthand side, as regards the drawing.

Referring to Figs. 26 to 32, the drive mechanism illustrated therein, differs from those described above in that the control chambers 51 and 52 are subdivided each into a control chamber 51*a* and 52*a* of constant volume and into a control chamber 51*b* and 52*b* of variable volume, respectively, the control chambers 51*a* and 52*b* connecting the work chambers 45 and 46 in dependancé on the mutual position of the guide means consisting of three parts 31*a*, 31*b*, 31*c*, the piston 30, 38, 39 and the slider consisting likewisely of three parts 32*a*, 32*b*, 32*c* alternately and in opposite sense to the high pressure chamber 59 and through an annular chamber 151 between the guide means part 31*b* and the piston 30, 38, 39 to the low pressure chamber 64, and the control chambers 51*b* and 52*b* of variable volume communicating in dependance on the mutual position of the guide means 31*a*, 31*b*, 31*c*, the piston 30, 38, 39 and the slider 32*a*, 32*b*, 32*c* with the high pressure chamber 59 and through the annular chamber 151 between the guide means 31*a*, 31*b*, 31*c* and the piston 30, 38, 39 with the low pressure chamber 64. It is to be mentioned that the work chamber 46 is, in the represented case, enclosed by the guide means part 31*c*, the piston portion 39 and, furthermore, by the insert 34 and the sleeve 114 with the ring 115 which may be regarded at as integral parts of the guide means 31*a*, 31*b*, 31*c* proper.

The front walls of the control chambers 51*a*, 51*b*, 52*a*, 52*b* are formed by sealing rings which are inserted between the piston 30, 38, 39 and the slider 32*a*, 32*b*, 32*c* and are fixed partly to the former and partly to the latter. Thus, the upper end of the slider part 32*a* has a sealing ring 152 fixed to it whilst the slider part 32*b* is provided at its both ends with sealing rings 153 and 154, respectively. The lower end of the slider part 32*c* carries a sealing ring 155 and on the inner side of the piston body 30 there is a sealing ring 156 fastened, like the others, by means of threads. Like sealing rings are fixed on the outer mantle surface of the piston 30, 38, 39 in order to form the front walls of the ante-chambers 47 and 48. The ante-chamber 47 is enclosed by sealing rings 157 and 158 screw-threadedly fixed on the piston portion 38 whilst the ante-chamber 48 is enclosed by sealing rings 159 and 160 screw-threadedly fixed to the piston portion 39. Obviously, the sealing rings might also be integral with the corresponding construction parts in which case they form e. g. shoulders thereof. Furthermore, the sealing rings 157, 158, 159, 160 form together with the piston 30, 38, 39 three outer shoulders as was the case with the embodiment shown in Figs. 1 to 10 whilst the sealing ring 156 forms an inner shoulder of the hollow piston 30, 38, 39. Likewisely, the sealing rings 152, 153, 154, 155 form outer shoulders of the slider 32*a*, 32*b*, 32*c*, particularly the sealing rings 152, 155 each a lateral shoulder and the sealing rings 153, 154 each an intermediate shoulder thereof.

In order to ensure the unhindered flow of the pressure medium some of the ducts of the drive mechanism described with the previous embodiments had to be doubled and further ducts proved to be necessary as well. Thus, the inlet ducts 67 and 78 are substituted by inlet ducts 67*a*, 67*b* and 78*a*, 78*b*, respectively, whilst the ducts 69 and 70 are substituted by ducts 69*a*, 69*b* and 70*a*, 70*b*, respectively. Moreover, the piston portion 38 is provided with further ducts 161 and 162 which extend across the sealing ring 158 and connect the control chamber 51*b* either through the inlet ducts 78*b* to the high pressure chamber 59 or through the annular chamber 151 to the low pressure chamber 64. Likewisely, the piston portion 39 is provided with ducts 163 and 164 which, on the other hand, connect the control chamber 52*b* either through the annular chamber 151 to the low pressure chamber 64, or through the inlet ducts 67*b* to the high pressure chamber 59. The outlet ducts 165 which are provided in the piston body 30 and extend also across the sealing ring 156 establish connection between the annular chamber 151 and the low pressure chamber 64 when the outlet ducts 165 register with outlet ducts 166 of the slider part 32*b*. As is clear from the drawing, the pressure prevailing in the work chamber 45 is able to act above the piston portion 38 provided that the latter is closed against the low pressure chamber 64 by a cap 167. Thus, the pressure acting in the direction of the impact, as suggested by the double arrow 107, loads not only upon a shoulder formed by the sealing ring 157 but also upon the whole cross section of the piston 30, 38, 39 in contradistinction to the pressure prevailing in the work chamber 46, as suggested by the double arrow 95, this pressure being destined to cause the piston 30, 38, 39 to return and acting only upon the shoulder formed by the sealing ring 159. Thus, the force acting in the direction of the impact substantially surpasses the force for returning the piston in contradistinction to the drive mechanisms described above where these forces were equal.

For damping the strikings up of the alternately moving parts in the dead-centre positions thereof in the upper-dead-centre position of the piston 30, 38, 39 the cap 167 fits into a hollow space 168 of the insert 40 so that a portion of the hydraulic medium becomes enclosed in the hollow space 168 and brakes the motion of the piston. Likewisely, in the upper dead-centre position of the slider 32*a*, 32*b*, 32*c* relatively to the piston 30, 38, 39 there remains an interstice 169 between the lower front surface of the cap 167 and the slider part 32*a*, and the upper front surface of the insert 34 is provided with a hollow space 170 which has the same destination as the shoulders 86 and 87 of the previously described embodiments.

Obviously, the operation of the drive mechanism is performed in a similar way as that of the drive mechanisms described in connection with Figs. 1 to 20, as is suggested by a like numbering of the arrows which show the flow of the hydraulic medium.

Figure 26:
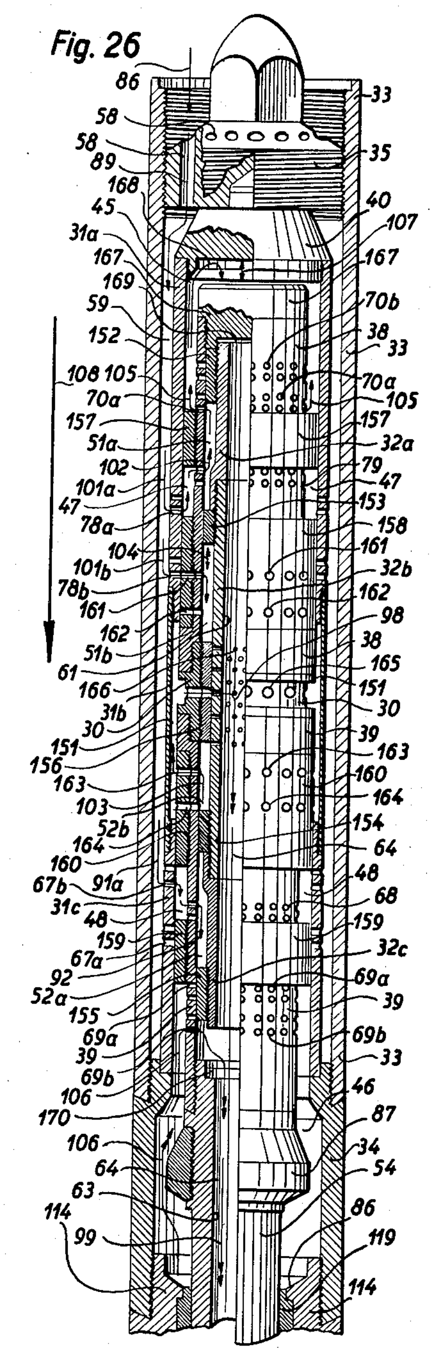

Fig. 26 shows the piston 30, 38, 39 in a position just after having left its upper dead-centre position. The hydraulic medium flows from the high pressure chamber 59 in the direction of the arrow 101*a* through the inlet ducts 78*a* into the ante-chamber 47, herefrom through the ducts 79 in the direction of the arrow 102 into the control chamber 51*a* and finally herefrom through the ducts 70*a* in the direction of the arrows 105 into the work chamber 45 where it acts, as suggested by the double arrow 107, upon the piston 30, 38, 39 displacing the same in the direction of the arrow 108. At the same time, hydraulic medium flows through the ducts 78*b* and 161 also into the control chamber 51*b* where it prevails, as indicated by the double arrow 104, and urges the slider 32*a*, 32*b*, 32*c* to occupy its upper dead-centre position relatively to the piston 30, 38, 39. Finally, hydraulic medium flows from the high pressure chamber 59 in the direction of the arrow 91*a* through the ducts 67*b* into the ante-chamber 48 and herefrom through the ducts 68 in the direction of the arrow 92 into the control chamber 52*a* where, however, its pressure becomes compensated. Simultaneously therewith the exhausted hydraulic medium withdraws from the work chamber 46 in the direction of the arrow 106 through the ducts 69b into the low pressure chamber 64 which receives also the hydraulic medium from the control chamber 52 which flows through the ducts 163 and 164 in the direction of the arrow 103 into the annular chamber 151 and herefrom through the ducts 165 and 166 in the direction of the arrows 98 and withdraws together with the hydraulic medium referred to by the arrow 106 in the direction of the arrow 99.

Figure 27:
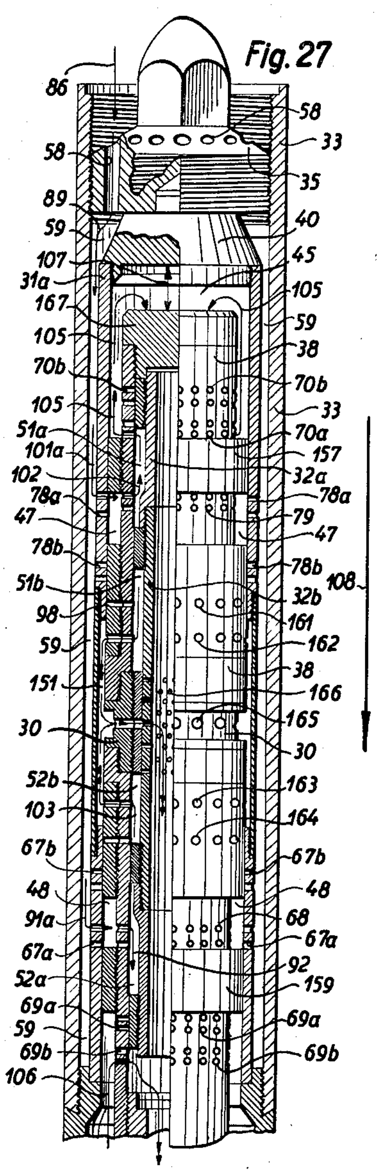

Fig. 27 shows an intermediate position of the piston 30, 38, 39 moving downwards in the direction of the arrow 108. The live hydraulic medium is flowing in into the work chamber 45 as has been described. Likewisely, it continuously flows into the control chamber 52a whilst the exhausted hydraulic medium is continously withdrawing from the work chamber 46 and from the control chamber 52b. However, the inlet ducts 78b became closed by the sealing ring 158 whilst the ducts 161 and 162 became free towards the annular chamber 151 so that the hydraulic medium flows from the control chamber 51b in the direction of the arrow 98 also into the annular chamber 151 and herefrom in the direction of the arrow 98 and 99 into the atmosphere. Thus, the overpressure which was prevailing in the control chamber 51b becomes compensated and the pressure of the low pressure chamber 64 prevails in both control chambers 51b and 52b so that the pressures acting upon the slider 32a, 32b, 32c are compensated.

Figure 28:
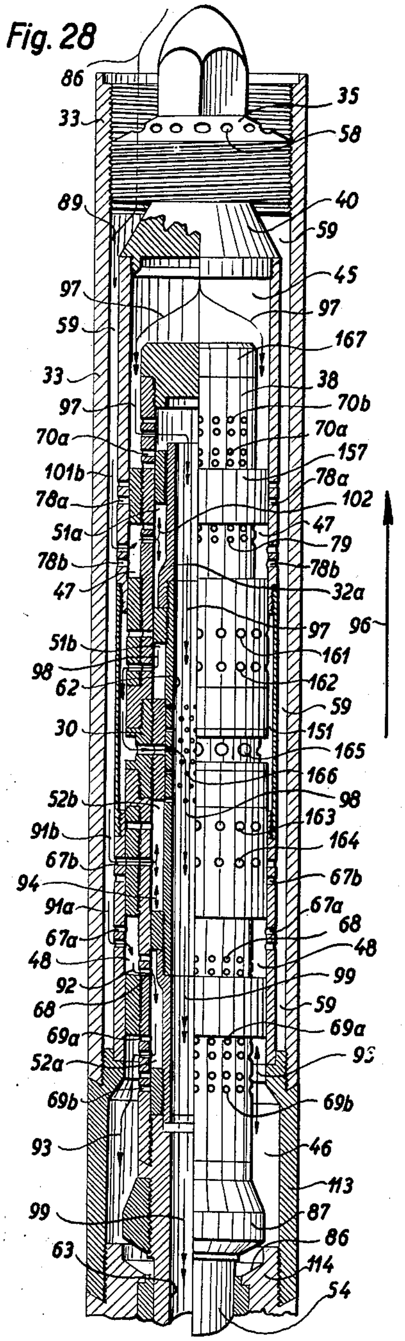
Figs. 26 to 29 show different working positions of a further embodiment of the invention in longitudinal sections.

In the working position, shown in Fig. 28, which is the lower dead-centre position of the drive mechanism, the live hydraulic medium flows from the high pressure chamber 59 through the opened ducts 78b in the direction of the arrow 101b into the ante-chamber 47 and herefrom through the ducts 79 in the direction of the arrow 102 into the control chamber 51a where its action becomes compensated. At the same time the inlet ducts 67b occupy a position in which they register with the ducts 164 so that live hydraulic medium flows in the direction of the arrow 91b into the control chamber 52b where it establishes a pressure, as suggested by the double arrow 94, and urges the slider 32a, 32b, 32c into its lower dead-centre position relatively to the piston 30, 38, 39. Thus, the position of the slider is changed whereby the ducts 69a are set free so that live hydraulic medium flows from the control chamber 52a in the direction of the arrow 93 into the work chamber 46 where it establishes a pressure prevailing as suggested by the double arrow 95 and upon the action of which the piston 30, 38, 39 begins its upward stroke in the direction of the arrow 96. Meanwhile, the flow of the exhausted hydraulic medium from the control chamber 51b in the direction of the arrows 98 is maintained. At the same time the exhausted hydraulic medium withdraws from the work chamber 45 in the direction of the arrows 97 through the outlet ducts 70b set free by the sealing ring 157 and flows together with the hydraulic medium indicated by the arrow 98 in the direction of the arrow 99 into the atmosphere.

Figures 29, 30:
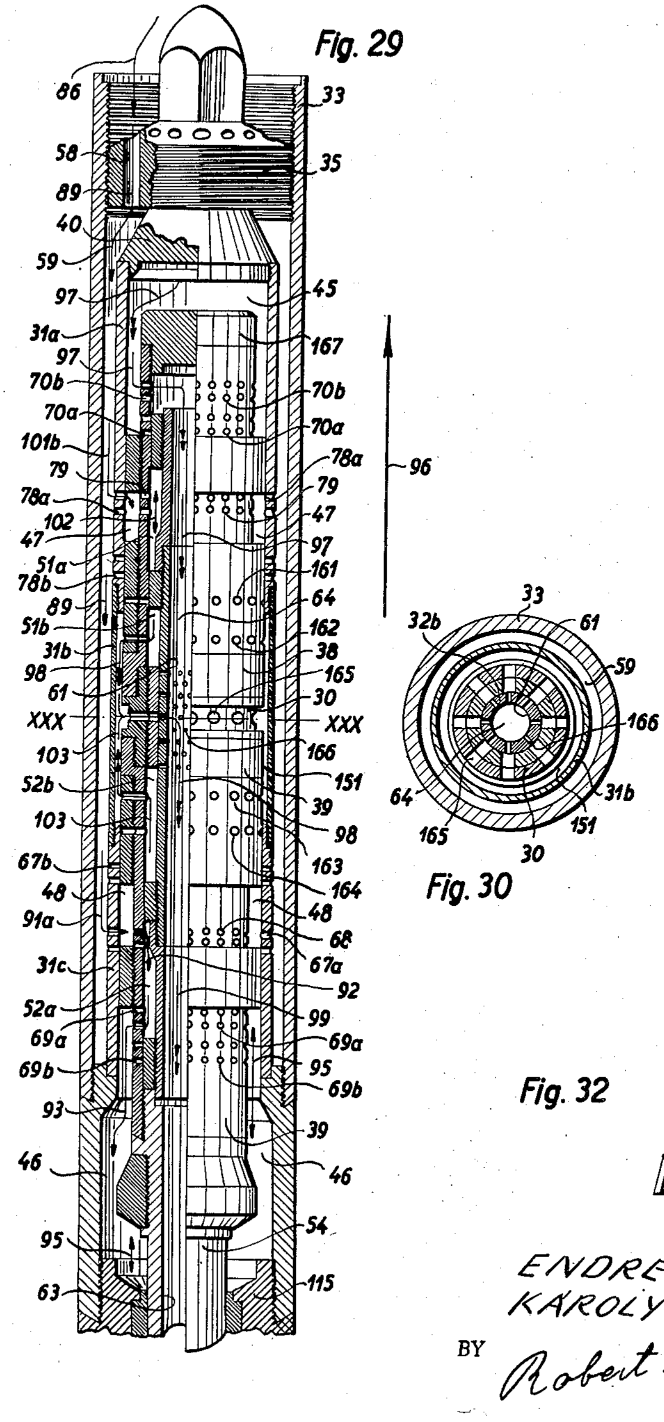
Fig. 30 is a cross section taken along line XXX—XXX of Fig. 29.

Fig. 29 illustrates an intermediate working position of the piston 30, 38, 39 while moving upwards in the direction of the arrow 96. As is clear from the drawing the flow of the live hydraulic medium into the work chamber 46 and the control chamber 51a as well as the withdrawal of the exhausted hydraulic medium from the work chamber 45 is continuously maintained. However, the inlet ducts 67b do not occupy a position any more in which they would register with the ducts 164 which are, together with the ducts 163, set free towards the annular chamber 151 so that the exhausted hydraulic medium withdraws from the control chamber 52b in the direction of the arrows 103 into the low pressure chamber 64 so that the pressures prevailing in the control chambers 51b and 52b become equal and the slider 32a, 32b, 32c is again relieved from overpressures, i. e. it is ready for changing its position.

As soon as the piston reaches its upper dead-centre position, the slider changes its position in the above described manner.

Figure 31:
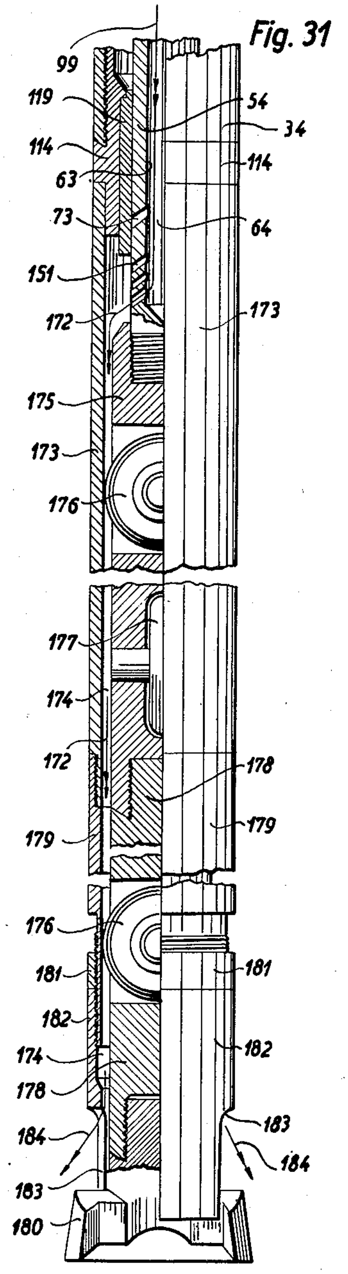
Fig. 31 shows, partly in section, a deep boring apparatus provided with a drive mechanism in compliance with the present invention.

Fig. 31 shows a deep boring apparatus provided with a drive mechanism as has been described in connection with Figs. 26 to 29. The lower end of the tool support 54 is provided with outlet ducts 171 through which the hydraulic medium withdrawing from the drive mechanism in the direction of the arrow 99 flows in the direction of the arrow 172 into the hollow space of a guide sleeve 173. Furthermore, the lower end of the tool support 54 has a heavy rod 175 screw-threadedly fixed to it which supports guide discs 176 and 177 arranged in longitudinal planes perpendicular to each other. The outer diameter of the discs 176 and 177 is somewhat smaller than the diameter of the hollow space 174 so that the discs freely roll on the wall of the guide sleeve 173 when contacting therewith thereby ensuring the swing-free motion of the rod 175. As is clear from the drawing, the heavy rod 175 may have further heavy rods 178 joined to it in a desired number. In such cases the guide sleeve 173 is also extended by a corresponding number of extensions 179. The last heavy rod 178 carries a tool 180 screw-threadedly fixed thereto which is surrounded by an extension 182 of the guide sleeve the position of the former being secured by a ring-fastener 181 leaving free the hollow space 174. The lower end of the sleeve extension 182 is provided with longitudinal slots 182 which ensure the unhindered motion of the tool 180 and through which the hydraulic medium flows in the direction of the arrow 183 into a not represented bore hole and washes off the slush in a manner known per se.

Figure 32:
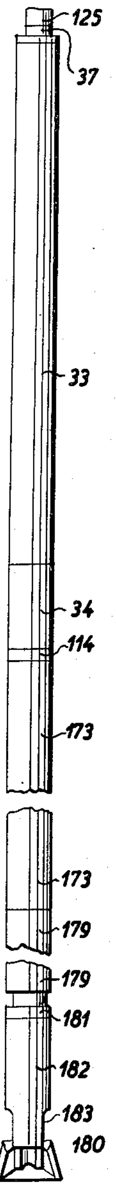
Fig. 32 is a plane view of the boring apparatus shown in Fig. 31.

Fig. 32 shows the drill machine in its completely built up state up to the joint of the supply duct 125.

Obviously, after removing the inlet head 35 the drive mechanism can be dismounted without any substantial assembly work. The individual construction parts can be removed each after the other and be again replaced whereafter their mutual position can be secured by screwing in the inlet head 32 again. The drive mechanism in accordance with the present invention is, therefore, favourable not only as regards the effectivity of the impact but also the simplicity of the construction and the assembly work.

Instead of water, other hydraulic or penumatic mediums as for instance compressed air might be used as well. Steam may be applied too in which case care may be taken that the communication of the high pressure chamber 59 with the work chambers 45 and 46 be interrupted in a suitable moment whereby the steam is caused to deliver expansion work. To this purpose the slider 32 of the embodiment shown in Figs. 1 to 10 can, for instance, be provided with further shoulders which interrupt the communication between the ante-chambers 47, 48 and the control chambers 51 and 52 at a predetermined mutual displacement of the slider 32 and the piston body 30.

What we claim is:

1. A drive mechanism for percussion tools operated by a pressure medium, comprising a high pressure chamber adapted to be connected to a source of such medium; a low pressure chamber adapted to be connected to the atmosphere; a guide means formed as a hollow rod and situated between said high pressure chamber and said low pressure chamber; a piston formed as a tool carrier and slidably arranged between two extreme positions along and around said guide means; a slider formed as a control means and slidably arranged between two extreme positions along said piston; a pair of work chambers arranged between said guide means and said piston on opposite ends of said guide means, the volumes of said work chambers varying alternately depending on the mutual position of said guide means and said piston; and ducts for connecting each of said work chambers alternately to said high pressure chamber and said low pressure chamber, respectively, depending on the mutual position of said guide means, said piston and said slider.

2. A drive mechanism for percussion tools operated by a pressure medium, comprising a high pressure chamber adapted to be connected to a source of such medium; a low pressure chamber adapted to be connected to the atmosphere; a guide means situated between said high pressure chamber and said low pressure chamber; a piston formed as a tool carrier and slidably arranged between two extreme positions along said guide means; a slider formed as a control means and slidably arranged between two extreme positions along said piston; two work chambers of volumes variable alternately in opposite sense in dependance on the mutual position of and each enclosed by said guide means and said piston; two ante-chambers each enclosed by said guide means and said piston and adapted to communicate with said high pressure chamber; two control chambers of constant volume each enclosed by said piston and said slider and associated with one of said work chambers and situated therebefore and adapted to communicate with said high pressure chamber each through one of said ante-chambers; two control chambers of volumes variable alternately in opposite sense in dependance on the mutual position of and each enclosed by said piston and said slider; an outlet chamber enclosed by said guide means and said piston and adapted to communicate with said low pressure chamber; and ducts for connecting each of said work chambers alternately to said high pressure chamber through said ante-chambers and said control chambers of constant volume and directly to said low pressure chamber, respectively, and for connecting said control chambers of variable volume to said high pressure chamber and through said outlet chamber to said low pressure chamber, respectively, in dependance on the mutual position of said guide means, said piston and said slider the mutual arrangement of said work chambers, said control chambers, said ante-chambers and said duct means compensating for the pressure prevailing in said control chambers of variable volume whenever said piston travels between its deadcenter positions and thereby to render said slider freely displaceable under the action of mass forces.

3. A drive mechanism for percussion tools operated by a pressure medium, comprising a high pressure chamber adapted to be connected to a source of such medium; a low pressure chamber adapted to be connected to the atmosphere; a guide means situated between said high pressure chamber and said low pressure chamber; a piston formed as a tool carrier and slidably arranged between two extreme positions along said guide means; a slider formed as a control means and slidably arranged between two extreme positions along said piston; a pair of work chambers arranged between said guide means and said piston on opposite ends of said guide means, the volumes of said work chambers varying alternately depending on the mutual position of said guide means and said piston; ducts for connecting each of said work chambers alternately to said high pressure chamber and said low pressure chamber, respectively, on the mutual position of said guide means, said piston and said slider; and means for securing the mutual angular position of said piston and said guide means.

4. A drive mechanism for percussion tools comprising a source of fluid under pressure, a fluid motor comprising a cylinder and a piston, said piston being formed as a tool carrier and slidably arranged within said cylinder between two extreme positions, valve means for controlling the operation of said piston and being slidably arranged for movement along said piston between two extreme positions, a pair of work chambers arranged between said cylinder and said piston on opposite ends of said cylinder, the volumes of said work chambers varying alternately depending on the movement of said piston in said cylinder, a pair of ante-chambers arranged between said cylinder and said piston and each being connected to one of said work chambers and arranged to supply fluid under pressure to said work chamber, a pair of control chambers each arranged between said valve means and said piston on opposite ends of said valve means, the volumes of said control chambers varying alternately depending upon the positions of said piston and said valve means, said control chambers being arranged to aid the actuation of said piston and said valve means, and duct means for connecting each of said work chambers alternately through said ante-chambers to said source of fluid under pressure and to atmosphere, respectively, depending on the mutual position of said cylinder, piston and valve means, the mutual arrangement of said work chamber, said control chamber, said ante-chamber and said duct means compensate for the pressures prevailing in said control chamber of variable volume whenever said piston travels between extreme positions and thereby render said valve means freely displaceable under the action of mass forces.

5. A drive mechanism for percussion tools comprising a source of fluid under pressure, a fluid motor comprising a cylinder and a piston, said piston being formed as a tool carrier and slidably arranged within said cylinder between two extreme positions, valve means for controlling the operation of said piston and being slidably arranged for movement along said piston between two extreme positions, a pair of work chambers arranged between said cylinder and said piston on opposite ends of said cylinder, the volumes of said work chambers varying alternately depending on the movement of said piston in said cylinder, a pair of ante-chambers arranged between said cylinder and said piston and each being connected to one of said work chambers and arranged to supply fluid under pressure to said work chamber, a pair of control chambers each arranged between said valve means and said piston on opposite ends of said valve means, the volumes of said control chambers varying alternately depending upon the positions of said piston and said valve means, said control chambers being arranged to actuate said piston and said valve means sequentially in the same direction, and duct means for connecting each of said work chambers alternately through said ante-chambers to said source of fluid under pressure and to atmosphere, respectively, depending on the mutual position of said cylinder, piston and valve, the mutual arrangement of said work chamber, said control chamber, said ante-chamber and said duct means compensate for the pressures prevailing in said control chamber of variable volume whenever said piston travels between extreme positions and thereby render said valve means freely displaceable under the action of mass forces.

6. A drive mechanism for percussion tools comprising a source of fluid under pressure, a fluid motor comprising a cylinder and a piston, said piston being formed as a tool carrier and slidably arranged within said cylinder between two extreme positions, valve means for controlling the operation of said piston and being slidably arranged for movement along said piston between two extreme positions, a pair of work chambers arranged between said cylinder and said piston on opposite ends of said cylinder, the volumes of said work chambers varying alternately depending on the movement of said piston in said cylinder, a pair of ante-chambers arranged between said cylinder on said piston and each being connected to one of said work chambers and arranged to supply fluid under pressure to said work chamber, a pair of control chambers each arranged between said valve means and said piston on opposite ends of said valve means and between said associated work chamber and ante-chamber, the volumes of said control chambers varying alternately depending upon the positions of said piston and said valve means, said control chambers being arranged to aid the actuation of said piston and said valve means, and duct means for connecting each of said work chambers alternately through said control chambers of variable volume and said ante-chambers to said source of fluid under pressure and to atmosphere, respectively, depending on the mutual position of said cylinder, piston and valve means, the mutual arrangement of said work chamber, said control chamber, said ante-chamber and said duct means compensating for the pressures prevailing in said control chamber of variable volume whenever said piston travels between extreme positions and thereby render said valve means freely displaceable under the action of mass forces.

7. A drive mechanism for percussion tools comprising a source of fluid under pressure, a fluid motor comprising a cylinder and a piston, said piston being formed as a tool carrier and slidably arranged within said cylinder between two extreme positions, valve means for controlling the operation of said piston and being slidably arranged within said piston for movement between two extreme positions, a pair of work chambers arranged between said cylinder and said piston on opposite ends of said cylinder, the volumes of said work chambers varying alternately depending on the movement of said piston in said cylinder, a pair of ante-chambers arranged between said cylinder and said piston and each being connected to one of said work chambers and arranged to supply fluid under pressure to said work chamber, a first pair of control chambers each arranged between said valve means and said piston on opposite ends of said valve means and between said associated work chamber and ante-chamber, the volumes of said first pair of control chambers remaining constant upon mutual displacement of said piston and valve means, a second pair of control chambers each arranged between said valve means and said piston, the volumes of said second pair of control chambers varying alternately depending upon the position of said piston and said valve means, said second pair of control chambers being arranged to aid the actuation of said piston and valve means upon the action of fluid under pressure prevailing therein, and duct means for connecting each of said work chambers alternately through said first control chambers of constant volumes and said ante-chambers to said source of fluid under pressure and to atmosphere, respectively, depending on the mutual position of said cylinder, piston and valve means, the mutual arrangement of said work chamber, said first control chambers, said ante-chamber, said second control chambers and said duct means compensating for the pressures prevailing in said second control chambers whenever said piston travels between its extreme positions and thereby renders said slider freely displaceable under the action of mass forces.

8. A drive mechanism for percussion tools operated by a pressure medium, comprising a high pressure chamber adapted to be connected to a source of such medium, a low pressure chamber adapted to be connected to the atmosphere, a guide means situated intermediate said high pressure chamber and said low pressure chamber so as to separate them from one another, a piston formed as a tool carrier and slidably arranged between two extreme positions along said guide means, a valve means for controlling the movements of said piston and slidably arranged between two extreme positions along said piston, a pair of work chambers each enclosed by said guide means and said piston intermediate said high pressure chamber and said low pressure chamber on opposite ends of said guide means, the volumes of said work chambers varying oppositely dependent on the mutual position of said guide means and said piston, a pair of ante-chambers each enclosed by said guide means and said piston intermediate said high pressure chamber and said work chambers, a pair of control chambers of variable volume each enclosed by said piston and said valve means intermediate said high pressure chamber and said low pressure chamber, the volumes of said control chambers of variable volume varying oppositely dependent on the mutual position of said piston and said valve means, and passages in said guide means and said piston for connecting said work chambers and said control chambers of variable volume alternately to said high pressure chamber and to said low pressure chamber depending on the mutual position of said guide means, said piston and said valve means so as to cause reciprocal motion of said piston and displacement thereof with respect to said valve means, respectively, and for establishing communication between said control chambers of variable volume whenever said piston travels between its extreme positions so as to compensate the pressure prevailing in said control chambers of variable volume and thereby to render said valve means freely displaceable under the action of its inertia.

9. The combination set forth in claim 8 in further combination with means for securing the mutual angular position of said guide means and said piston.

10. A drive mechanism for percussion tools operated by a pressure medium comprising a high pressure chamber adapted to be connected to a source of such medium, a low pressure chamber adapted to be connected to the atmosphere, a hollow guide means situated intermediate said high pressure chamber and said low pressure chamber so as to separate them from one another, a piston formed as a tool carrier and slidably arranged between two extreme positions along said hollow guide means, a valve means for controlling the movements of said piston and slidably arranged between two extreme positions along said piston, a pair of work chambers each enclosed by said hollow guide means and said piston on opposite ends of said hollow guide means, the volumes of said work chambers varying oppositely dependent on the mutual position of said hollow guide means and said piston, a pair of ante-chambers each enclosed by said hollow guide means and said piston intermediate said high pressure chamber and said work chambers, a pair of control chambers of variable volume each enclosed by said piston and said valve means between said ante-chambers and said work chambers, the volumes of said control chambers of variable volume varying oppositely dependent on the mutual position of said piston and said valve means, and passages in said hollow guide means and said piston for connecting said work chambers and said control chambers of variable volume alternately to said high pressure chamber and to said low pressure chamber depending on the mutual position of said hollow guide means, said piston and said valve means so as to cause reciprocal motion of said piston and displacement thereof with respect to said valve means, respectively, and for establishing communication between said control chambers of variable volume through said high pressure chamber whenever said piston travels between its extreme positions so as to compensate the pressures prevailing in said control chambers of variable volume and thereby to render said valve means freely displaceable under the action of its inertia.

11. A drive mechanism for percussion tools as claimed in claim 10 wherein said piston is formed by a hollow body slidably surrounding said hollow guide means.

12. A drive mechanism for percussion tools as claimed in claim 10 wherein said piston is arranged within said hollow guide means.

13. A drive mechanism for percussion tools operated by a pressure medium comprising a high pressure chamber adapted to be connected to a souce of such medium, a low pressure chamber adapted to be connected to the atmosphere, a hollow guide means situated between said high pressure chamber and said low pressure chamber so as to separate them from one another, a hollow piston formed as a tool carrier and slidably arranged between two extreme positions along and within said hollow guide means, a valve means for controlling the movements of said piston and slidably arranged between two extreme positions along and within said hollow piston, a pair of work chambers each enclosed by said hollow guide means and said hollow piston on opposite ends of said hollow guide means, the volumes of said work chambers varying oppositely dependent on the mutual position of said hollow guide means and said hollow piston, a pair of ante-chambers each enclosed by said hollow guide means and said hollow piston intermediate said high pressure chamber and said work chambers, a pair of control chambers of constant volume each enclosed by said hollow piston and said valve means between said ante-chambers and said work chambers, a pair of control chambers of variable volume each enclosed by said hollow piston and said valve means between said high pressure chamber and said low pressure chamber, the volumes of said control chambers of variable volume varying oppositely dependent on the mutual position of said hollow piston and said valve means, and passages in said hollow guide means and said hollow piston for alternately connecting said work chambers through said ante-chambers and said control chambers of constant volume and through said control chambers of variable volume directly to said high pressure chamber and to said low pressure chamber depending on the mutual position of said guide means, said hollow piston and said valve means so as to cause reciprocal motion of said piston and displacement thereof with respect to said valve means, respectively, and for establishing communication between said control chambers of variable volume whenever said piston travels between its extreme positions so as to compensate the pressures prevailing in said control chambers of variable volume and thereby to render said valve means freely displaceable under the action of its inertia.

References Cited in the file of this patent

UNITED STATES PATENTS

| | | |
|---|---|---|
| 213,134 | Richmann | Mar. 11, 1879 |
| 397,166 | Barth | Feb. 5, 1889 |